United States Patent
Soejima et al.

(10) Patent No.: US 8,000,881 B2
(45) Date of Patent: Aug. 16, 2011

(54) INTERNAL COMBUSTION ENGINE CONTROL DEVICE

(75) Inventors: Shinichi Soejima, Gotemba (JP); Keisuke Kawai, Odawara (JP); Hiroyuki Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 170 days.

(21) Appl. No.: 12/449,032

(22) PCT Filed: Mar. 27, 2008

(86) PCT No.: PCT/JP2008/055875
§ 371 (c)(1),
(2), (4) Date: Jul. 21, 2009

(87) PCT Pub. No.: WO2008/120664
PCT Pub. Date: Oct. 9, 2008

(65) Prior Publication Data
US 2010/0017095 A1  Jan. 21, 2010

(30) Foreign Application Priority Data

Mar. 29, 2007  (JP) .................................. 2007-086721

(51) Int. Cl.
*B60T 7/12*  (2006.01)
(52) U.S. Cl. .................... 701/104; 701/105; 123/406.23; 123/672
(58) Field of Classification Search .................. 701/101, 701/103–105, 108, 110, 114, 115; 123/434–436, 123/406.23, 406.24, 672
See application file for complete search history.

(56) References Cited

U.S. PATENT DOCUMENTS

| | | | | |
|---|---|---|---|---|
| 5,818,116 A | * | 10/1998 | Nakae et al. | 290/38 R |
| 6,155,230 A | * | 12/2000 | Iwano et al. | 123/339.16 |
| 6,457,353 B1 | * | 10/2002 | Kanke et al. | 73/114.42 |
| 7,177,751 B2 | * | 2/2007 | Froloff et al. | 701/102 |
| 7,337,766 B2 | * | 3/2008 | Nakayama et al. | 123/435 |
| 2005/0197762 A1 | | 9/2005 | Yoshino et al. | |
| 2010/0211287 A1 | * | 8/2010 | Ohtsuka et al. | 701/102 |

FOREIGN PATENT DOCUMENTS

| | | |
|---|---|---|
| JP | A-11-062658 | 3/1999 |
| JP | A-2003-097330 | 4/2003 |
| JP | A-2004-044527 | 2/2004 |
| JP | A-2005-233110 | 9/2005 |
| JP | A-2006-016973 | 1/2006 |
| JP | A-2006-183506 | 7/2006 |

* cited by examiner

*Primary Examiner* — John T Kwon
(74) *Attorney, Agent, or Firm* — Oliff & Berridge, PLC

(57) ABSTRACT

The present invention provides an internal combustion engine control device which is capable of implementing a plurality of functions desired to the internal combustion engine. An adder unit determines a total energy E_total that should be generated by the engine by adding a target work, a target exhaust energy and cooling heat loss, which are calculated in a style of energy. A target fuel supply quantity calculation unit calculates a target fuel supply quantity necessary for generating the E_total. A target intake quantity calculating unit calculates a target intake quantity based on the target fuel supply quantity and a target A/F. A target ignition timing calculation unit calculates a target ignition timing necessary for realizing the target exhaust energy.

12 Claims, 5 Drawing Sheets

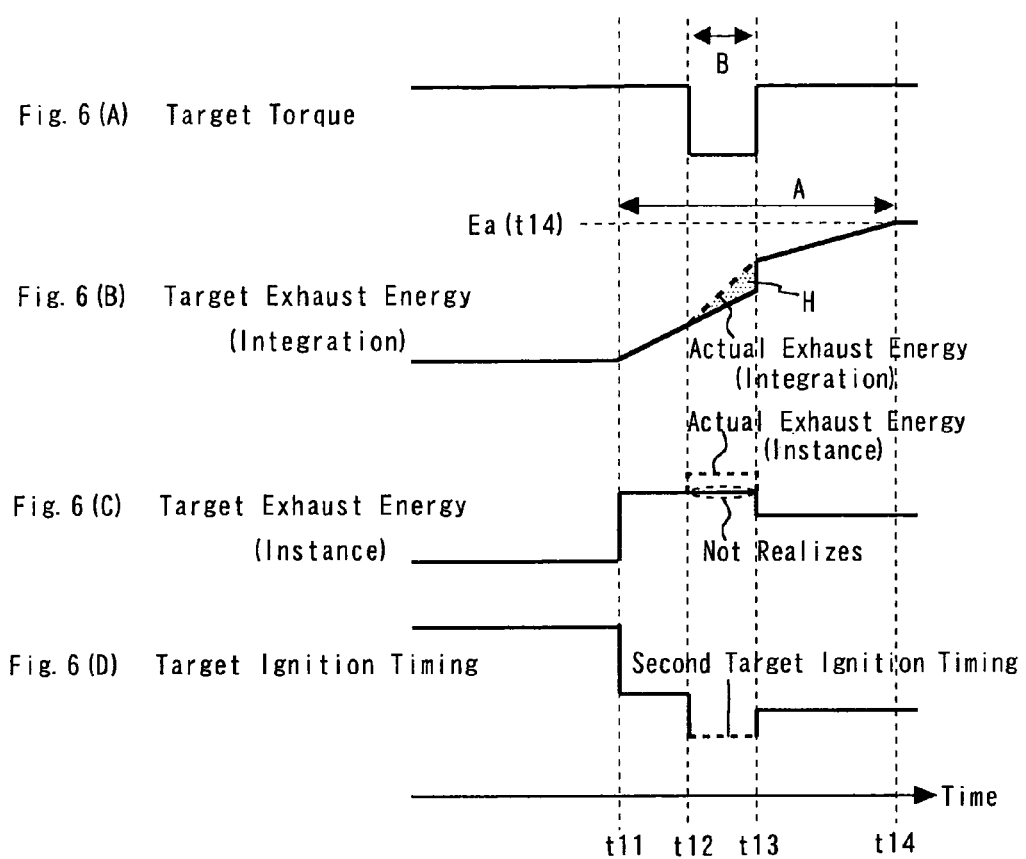

INTERNAL COMBUSTION ENGINE CONTROL DEVICE

TECHNICAL FIELD

The present invention relates to a control device of an internal combustion engine, more particularly to calculation of a plurality of control quantities by which it is possible to control energy generated in an internal combustion engine.

BACKGROUND ART

An apparatus for controlling functional elements of an internal combustion engine in order to achieve a target torque that is set based on an acceleration operating quantity by a driver and a requirement for a driving system or the like is known in the art (see, for example, Japanese Patent Laid-Open No. 2006-183506).

Also, an apparatus for controlling injection quantity in order to implement a required work load that is required by an acceleration operating quantity is known in the art (see, for example, Japanese Patent Laid-Open No. 2003-97330). The apparatus shown in this publication performs a subsidiary injection along with a main injection. More particularly, a work equivalent of the subsidiary injection is calculated in order to control the main injection so that the sum of the calculated work equivalent and a work equivalent of the main injection becomes equal to the above described work load.

DISCLOSURE OF THE INVENTION

Problem to be Solved by the Invention

The function required to an internal combustion engine is not limited to generating a torque (work) for driving a vehicle according to a driver's intention. Besides the generation of the torque (work), a function for increasing exhaust energy and a function for optimally controlling an air fuel ratio are also required for improving an emission characteristic.

However, neither Japanese Patent Laid-Open No. 2006-183506 nor Japanese Patent Laid-Open No. 2003-97330 disclose the functions required to an internal combustion engine except for the generation of the required torque.

The present invention has been made to solve the above problem. It is an object of the present invention to provide a control device of an internal combustion engine that is capable of achieving a plurality of functions required to an internal combustion engine.

Means for Solving the Problem

To achieve the above mentioned purpose, the first aspect of the present invention is an internal combustion engine control device, comprising:

control quantity calculation means for calculating a plurality of control quantities by which an energy generated by the internal combustion engine can be adjusted; and drive control means for executing driving controls for a plurality of actuators based on the plurality of control quantities calculated by control quantity calculation means said led variables calculated by the controlled variable calculation means, wherein said control quantity calculation means comprising:

desired value calculation means for calculating a desired value regarding a power of said internal combustion engine means, a desired value regarding exhaust of said internal combustion engine and a desired value regarding a cooling heat loss of said internal combustion engine, respectively in a style of energy; and desired value adding means for adding each desired value calculates by said desired value calculation means for determining a total desired value, wherein said control quantity calculation means determines said plurality of control quantities based on said total desired value.

The second aspect of the present invention is the internal combustion engine control device according to the first aspect of the present invention, wherein said plurality of control quantities are an intake quantity and an ignition timing, and said control quantity calculation means further comprises:

fuel supply quantity calculation means for calculating a fuel supply quantity necessary for generating said total desired quantity;

intake quantity calculation means for calculating an intake quantity necessary for implementing a predetermined air-fuel ratio while using said fuel supply quantity; and ignition timing calculation means for calculating said ignition timing while using said desired value regarding exhaust.

The third aspect of the present invention is the internal combustion engine control device according to the second aspect of the present invention, wherein said ignition timing calculation means comprises:

exhaust gas quantity calculation means for calculating an exhaust gas quantity of said internal combustion engine while using said fuel supply quantity and said intake quantity; and in-cylinder temperature calculation means for calculating an in-cylinder temperature based on said exhaust gas quantity and said desired value regarding exhaust, wherein said ignition timing calculation means calculates said ignition timing based on said in-cylinder temperature.

The fourth aspect of the present invention is the internal combustion engine control device according to the second aspect of the present invention, wherein said internal combustion engine is mounted on a vehicle, and said control quantity calculation means comprises:

second ignition timing calculation means for calculating a second ignition timing based on said desired value regarding power; and ignition timing selecting means for selecting either the ignition timing calculated by said ignition timing calculation means or said second ignition timing, based on a driving condition of said vehicle.

The fifth aspect of the present invention is the internal combustion engine control device according to the fourth aspect of the present invention, wherein said control quantity calculation means further comprises correction means for correcting said desired value regarding exhaust when said ignition timing is selected again by said ignition timing selecting means after said second ignition timing is selected by said ignition timing selecting means.

The sixth aspect of the present invention is the internal combustion engine control device according to the fifth aspect of the present invention, wherein said control quantity calculation means further comprises exhaust energy estimation means for estimating an actual exhaust energy arising during the period in which said second ignition timing is selected by said ignition timing selecting means, and said correction means corrects said desired value regarding exhaust while considering the actual exhaust energy estimated by said exhaust energy estimation means.

Advantages of the Invention

According to the first aspect of the present invention, a desired value regarding an engine power, a desired value regarding exhaust and a desired value regarding a cooling heat loss are calculated in a style of energy, respectively, for determining a total desired value for the internal combustion engine by adding each calculated desired value. Then, a plurality of control quantities by which the energy generated in the internal combustion engine can be adjusted are calculated based on the total desired value. According to the first aspect of the present invention, driving controls of a plurality of actuators are performed based on the plurality of control quantities calculated while considering not only the engine power but also exhaust and cooling heat loss. The plurality of functions desired to the internal combustion engine, therefore, can be implemented by driving the plurality of actuators.

According to the second aspect of the present invention, a fuel supply quantity is calculated so that the desired value regarding an engine power, the desired value regarding exhaust and the desired value regarding a cooling heat loss are satisfied. Further, the intake quantity is calculated so that the air-fuel ratio accords with a predetermined air-fuel ratio while the ignition timing is calculated so that the desired value regarding exhaust is satisfied. According to the second aspect of the present invention, a function regarding exhaust can be implemented in addition to a function regarding an engine power.

According to the third aspect of the present invention, exhaust gas quantity of the internal combustion engine is calculated based on the fuel supply quantity and the intake quantity, which are determined based on the total desired value, then an in-cylinder temperature is calculated while using said exhaust gas quantity and the desired value regarding exhaust. The requirement regarding exhaust can be precisely implemented by calculating an ignition timing while considering the in-cylinder temperature since an in-cylinder temper correlates with an ignition timing.

In the forth aspect of the present invention, the internal combustion engine is mounted on a vehicle; the second ignition timing is calculated based on the desired value regarding the engine power, and either the ignition timing on the basis of the desired value regarding exhaust or the second ignition timing is selected. According to the fourth aspect of the present invention, it is possible to respond to a rapid change of the desired value regarding the engine power by selecting the second ignition timing.

The desired value regarding exhaust may not be satisfied during the period when the above mentioned second ignition timing is selected. According to the fifth aspect of the present invention, the desired value regarding exhaust is corrected when the ignition timing is selected again. Because of this, the function regarding exhaust can be implemented even in a case where the second ignition timing is selected.

According to the sixth aspect of the present invention, the actual exhaust energy arising during the period in which the second ignition timing is selected is estimated. Then, the desired value regarding exhaust is corrected while considering the estimated actual exhaust energy. As a result, the function regarding exhaust can be implemented with a high accuracy.

BRIEF DESCRIPTION OF THE DRAWINGS

FIG. 6 (A) to FIG. 6 (D) are timing charts showing a change of a target exhaust energy at the time when an ignition timing is changed in order to rapidly change a target torque in the second embodiment of the present invention.

Figure 1:
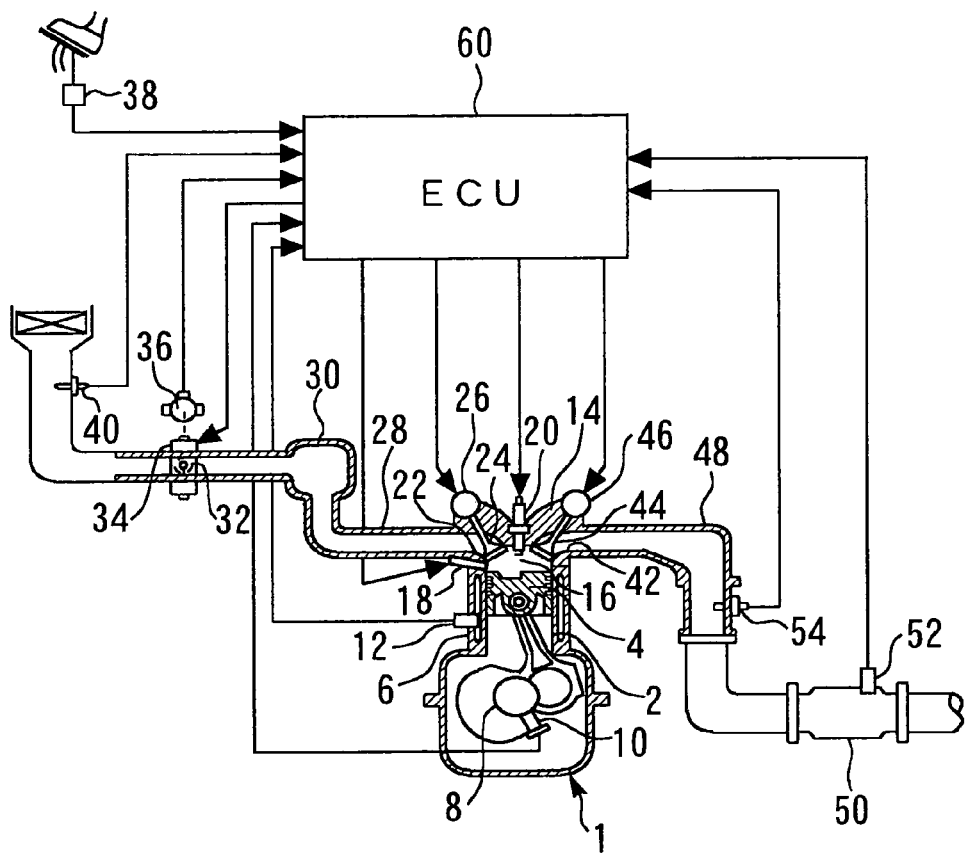
FIG. 1 is a drawing for explaining a structure of a system according to a first embodiment of the present invention.

1 engine
12 injector
20 ignition plug
24 intake valve
26 variable valve mechanism
32 throttle valve
34 throttle motor
60 ECU
61 target work calculation unit
62 target exhaust energy calculation unit
63 cooling heat loss calculation unit
64 adder unit
65 target quantity of fuel supply calculation unit
66 target intake air quantity calculation unit
67 target ignition timing calculation unit
67A exhaust gas quantity calculation unit
67B target in-cylinder temperature calculation unit
67C target ignition timing determination unit
68 second target ignition timing calculation unit
69 selector unit
70 exhaust energy estimation unit

BEST MODE FOR CARRYING OUT THE INVENTION

Now, an embodiment of the present invention will be described with reference to drawings. Common elements in the drawings are given the same reference number and redundant description will be omitted.

First Embodiment

Description of System Configuration

FIG. 1 is a drawing for explaining a structure of a system according to a first embodiment of the present invention. The system shown in FIG. 1 is provided with an internal combustion engine 1 which is a spark-ignition type gasoline engine (referred to as "engine", hereafter). The engine 1 has a plurality of cylinders 2. FIG. 1 shows only one cylinder among the plurality of cylinders.

The engine 1 has a cylinder block 6 having a piston 4 therein. The piston 4 is connected to a crankshaft 8 through crank mechanism. A crank angle sensor 10 is installed in the vicinity of the crankshaft 8. The crank angle sensor 10 is constructed so as to detect a turning angle (crank angle CA) of the crankshaft 8. Further, a cooling water temperature sensor 12 is provided to the cylinder block 6 for detecting a cooling water temperature Tw of the engine 1.

A cylinder head 14 is installed on the upper part of the cylinder block 6. The space between the upper surface of the piston 4 and the cylinder head 14 forms a combustion chamber 16. The cylinder head 14 is provided with an injector 18 that injects fuel directly in the combustion chamber 16. Further, the cylinder head 14 is provided with an ignition plug 20 for igniting fuel/air mixture in the combustion chamber 16.

The cylinder head 14 is provided with an intake port 22 which communicates with the combustion chamber 16. An intake valve 24 is installed in a connected portion between the intake port 22 and the combustion chamber 16. The intake valve 24 is provided with a variable valve mechanism 26 which is capable of changing opening characteristics (opening-closing valve timing, lift quantity) of the intake valve 24.

The intake port 22 is connected to an intake path 28. A surge tank 30 is installed in the intake path 28. A throttle valve 32 is installed in the upstream of the surge tank 30. The throttle valve 32 is of an electrically controlled type that is driven by a throttle motor 34. The throttle valve 32 is driven based on an accelerator angle AA detected by an accelerator angle sensor 38, or the like. Throttle angle sensor 36 for detecting a throttle angle TA is installed in the vicinity of the throttle valve 32.

An airflow meter 40 is installed in the upstream of the throttle valve 32. The airflow meter 40 is constructed so as to detect an intake air quantity (referred to as "intake quantity", hereafter) Ga.

Furthermore, the cylinder head 14 includes an exhaust port 42 which communicates with the combustion chamber 16. An exhaust valve 44 is installed in a connected portion between the exhaust port 42 and the combustion chamber 16. The exhaust valve 44 is provided with a variable valve mechanism 46 which is capable of changing opening characteristics (opening-closing valve timing, lift quantity) of the exhaust valve 44. The exhaust port 42 is connected to an exhaust path 48. The exhaust path is provided with an exhaust purification catalyst (referred to as "catalyst", hereafter) 50 for purifying exhaust gas. The catalyst 50 is provided with a catalyst bed temperature sensor 52 which detects a catalyst bed temperature Tc. Further, An air-fuel ratio sensor 54 for detecting an exhaust air fuel ratio is installed in the upstream of the catalyst 50.

The system according to the present embodiment includes a control device, i.e., an ECU (Electronic Control Unit) 60. The output side of the ECU 60 is connected to the injector 18, the ignition plug 20, the variable valve mechanism 26, 46, and the throttle motor 34 or the like. The input side of the ECU 60 is connected to the crank angle sensor 10, the cooling water temperature sensor 12, the throttle angle sensor 36, the accelerator angle sensor 38, the airflow meter 40, the catalyst bed temperature sensor 52, and the air-fuel ratio sensor 54 or the like.

The ECU 60 calculates an engine revolution number NE based on a crank angle CA. Further, the ECU 60 calculates a load KL required to the engine 1 based on an accelerator angle AA.

The ECU 60 executes the control of the engine 1 based on outputs of various sensors. More particularly, a target quantity of fuel supply, a target intake quantity and a target ignition timing are calculated by a technique described later for executing driving controls of various actuators (the injector 18, the accelerator motor 34, the variable valve mechanisms 26, 46, the ignition plug 20).

Feature of First Embodiment

As shown in the Patent Documents 1 and 2, executing controls of a fuel supply quantity and an ignition timing control or the like is known as a technique for implementing a target torque determined based on an accelerator angle or the like.

However, the function required to the engine is not limited to a work (power) for driving a vehicle, rather including a function for increasing an exhaust energy as well as a function for optimally controlling an air-fuel ratio in order to improving an emission characteristics. The torque demanding control described in the above Patent Documents 1 and 2 cannot achieve all functions required to the engine.

Figure 2:
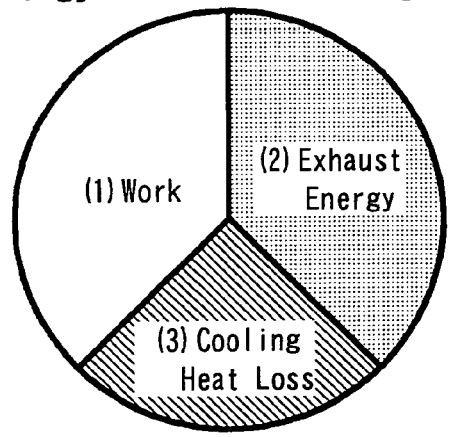
FIG. 2 is a drawing for explaining distribution of energy generated in an engine.

It is known that the energy generated by an engine is divided to (A) Work, (B) Exhaust Energy and (C) Cooling Loss, as shown in FIG. 2.

Thus, the present embodiment tries to calculate the total energy generated by the engine 1 while totally considering the individual requirements from the work, the exhaust energy and the cooling heat loss for implementing the all functions required to the engine 1. Further, for implementing this energy, the present embodiment tries to determine control quantities such as a fuel injection quantity, an intake quantity and an ignition timing. Hereinafter, a technique for calculating the control quantities will be described.

Figure 3:
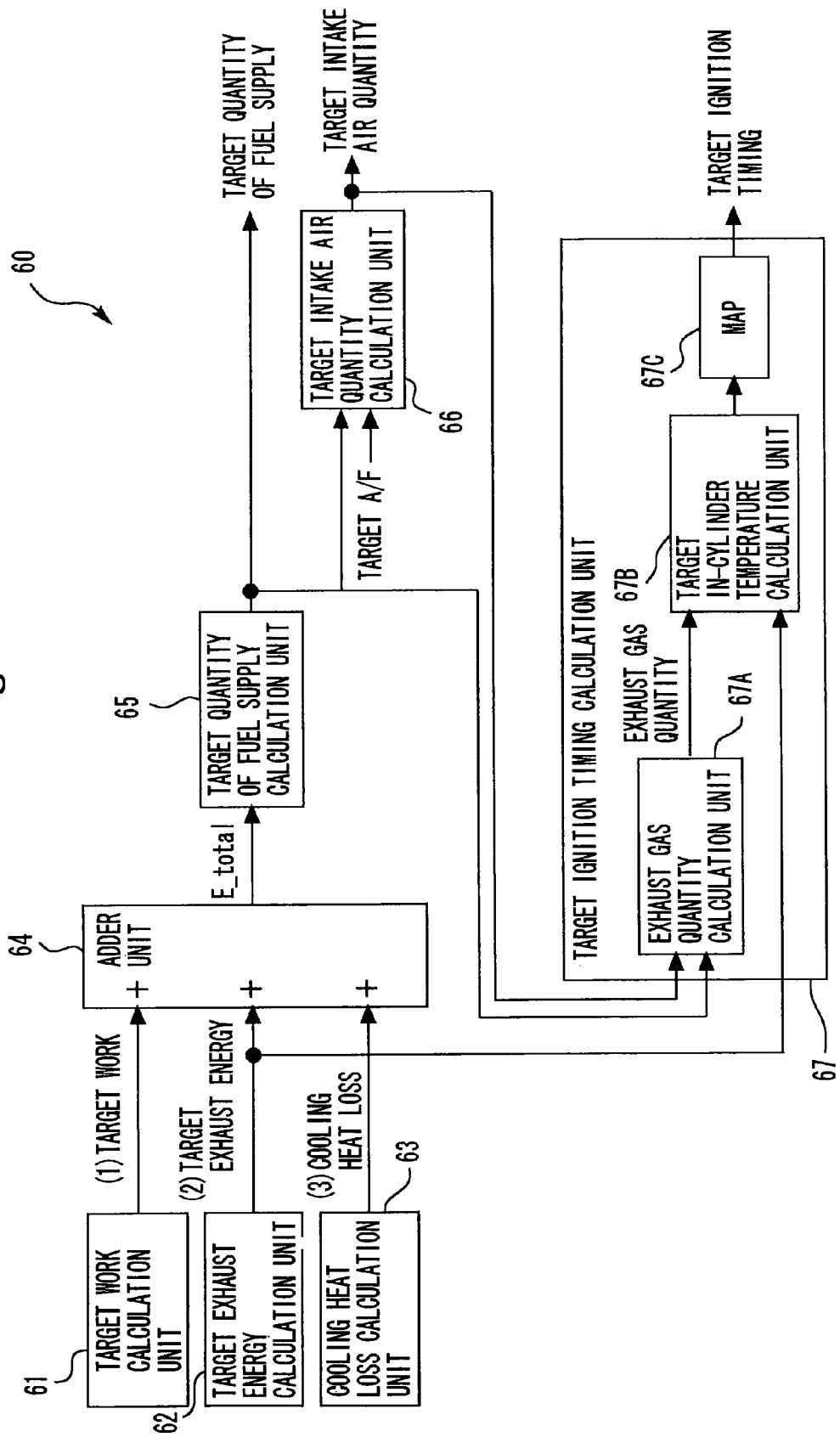
FIG. 3 is a drawing for explaining a control quantity calculation flow executed in an ECU 60 in the first embodiment.

FIG. 3 is a drawing for explaining a control quantity calculation flow executed in an ECU 60 in the present first embodiment.

A target work calculation unit 61 shown in FIG. 3 calculates a target torque based on a driver's requirement (e.g., accelerator opening AA), various controls for a vehicle (e.g., cruise drive) or the like, further calculating a target work in a style of energy based on the calculated target torque. That is, an energy that is necessary for realizing the target work is calculated. The calculated target work is supplied to an adder unit 64.

Further, a target exhaust energy calculation unit 62 calculates a target exhaust energy based on a warming up condition of the catalyst 50 while employing a model or a map. In other words, an energy that is necessary for warming up the catalyst is calculated. The warming up condition of the catalyst 50 can be grasped based on a catalyst bed temperature Tc. The calculated target exhaust energy is supplied to the adder unit 64. In addition, the target energy is also supplied to a target ignition timing calculation unit 67 described later.

It should be noted that, in a case where the engine is equipped with a supercharger, the target exhaust energy can be calculated by considering a target boost pressure, a target turbine revolution number or the like besides the warming up condition. In this case, an energy that is necessary for warming up the catalyst and achieving a desired boost condition is calculated.

Moreover, a cooling heat loss calculation unit 63 estimates a mechanical friction based on an engine revolution number NE and a cooling water temperature Tw while employing a model and a map, further calculating a cooling heat loss in a style of energy based on the estimated mechanical friction. In other words, energy consumed by the cooling heat loss is calculated. The calculated cooling heat loss is supplied to the adder unit 64.

The adder unit 64 adds the target work, the target exhaust energy and the cooling heat loss. The target work and the target exhaust energy are calculated in a style of energy, as stated above. Thus, a target total energy (referred to as "E_total", hereafter) that should be generated by the engine 1 can be calculated by the adding treatment performed by the adder unit 64. The calculated E_total is supplied to a target supply fuel quantity calculation unit 65.

The target supply fuel quantity calculation unit 65 calculates a fuel supply quantity that is necessary to generate the E_total (referred to as "target fuel supply quantity", hereafter) according to the next expression (1). Afterward, the ECU 60 determines a driving control quantity of the injector 18 that is an actuator for realizing the target fuel supply quantity.

$$\text{Target Fuel Supply Quantity} = E\_\text{total}/(\text{Lower Heating Value per the Unit Volume of Fuel}) \quad (1)$$

It should be noted that the "lower heating value per the unit volume of fuel" in the above expression (1) varies depending on a composition of fuel. Therefore, it can be obtained by determining the composition of fuel by means of detection or estimation and obtaining a lower heating value according to the determined component employing a map or a function.

The target fuel supply quantity calculated according to the above expression (1) is supplied to a target intake quantity calculation unit 66. The target intake quantity calculation unit 66 is supplied with a target A/F ratio besides the target fuel supply quantity. Although the target A/F is usually set to the theoretical air-fuel ratio (=14.6), it may be set to a rich air-fuel ratio or a lean air-fuel ratio in a case where a capability of the engine 1 such as a lean burn operation is implemented.

The target intake quantity calculation unit 66 calculates a required intake quantity (referred to as "target intake quantity", hereafter) for implementing the target A/F while using the target fuel supply quantity. Concretely, the target intake quantity is obtained by multiplying the target A/F with the target fuel supply quantity, as shown in the following expression.

$$\text{Target Intake Quantity} = \text{Target Fuel Supply Quantity} \times \text{Target } A/F \quad (2)$$

Afterward, the ECU 60 determines a throttle angle TA and an intake valve opening characteristic (valve opening-closing timing and lift amount) for implementing the above target intake quantity, further determining driving control quantities for the actuators, i.e., for the throttle motor 34 and the variable valve mechanism 26.

Also, a target ignition timing calculation unit 67 calculates a target ignition timing while using the above mentioned target exhaust energy. In the example shown in FIG. 3, the target ignition timing is calculated by utilizing a correlation between an exhaust energy and an in-cylinder combustion gas temperature (referred to as "in-cylinder temperature", hereafter) and a correlation between an in-cylinder temperature and an ignition timing. It should be noted that the in-cylinder temperature stated here is one that prevails when the exhaust valve opens.

As shown in FIG. 3, the target ignition timing calculation unit 67 includes an exhaust gas quantity calculation unit 67A, a target in-cylinder temperature calculation unit 67B and a target ignition timing determination unit 67C.

At first, the exhaust gas quantity calculation unit 67A calculates a gas quantity exhausted from the engine 1 (referred to as "exhaust gas quantity", hereafter) by adding the target fuel supply quantity and the target intake quantity which are inputted. The calculated exhausted gas quantity is supplied to the target in-cylinder temperature calculation unit 67B. Then, the target in-cylinder temperature calculation unit 67B calculates a target in-cylinder temperature by utilizing the relationship of the following expression (3), that is, according to the following expression (4) that is obtained by transforming the following expression (3). Here, it should be noted that the "C" in the following expressions (3) and (4) is a coefficient.

$$\text{Exhaust Energy} = C \times \text{In-cylinder Temperature} \times \text{Exhaust Gas Quantity} \quad (3)$$

$$\text{Target In-cylinder Temperature} = \text{Target exhaust energy}/(C \times \text{Exhaust Gas Quantity}) \quad (4)$$

The target in-cylinder temperature calculated according to the above expression (4) is supplied to the target ignition timing determination unit 67C. The target ignition timing determination unit 67C stores a map in which a target in-cylinder temperature and an ignition timing for realizing the target in-cylinder temperature (i.e., target ignition timing) are described. The target ignition timing determination unit 67C determines the target ignition timing according to the inputted target in-cylinder temperature with reference to this map.

Afterward, the ECU 60 determines a driving control quantity of the ignition plug 20 which is the actuator for realizing the determined target ignition timing.

Figure 4:
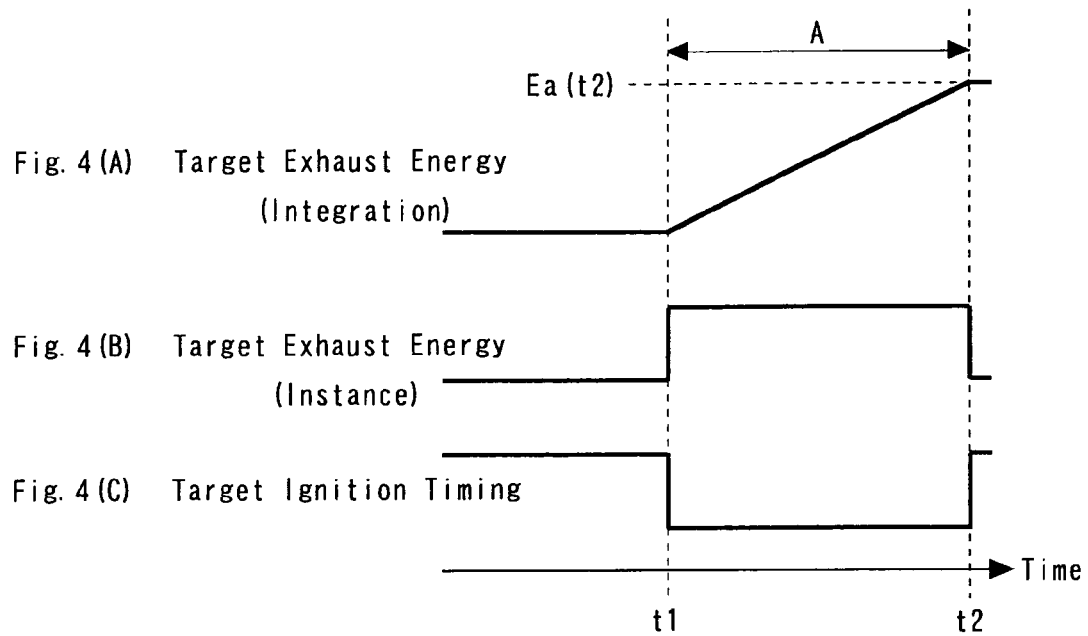
FIG. 4 (A) to FIG. 4 (C) are timing charts showing changes of a target exhaust energy and a target ignition timing in the first embodiment.

FIG. 4 (A) to FIG. 4 (C) are timing charts showing changes of a target exhaust energy and a target ignition timing in the first embodiment. More concretely, FIG. 4 (A) shows a change of an integration value of a target exhaust energy; FIG. 4 (B) shows a change of an instant target exhaust energy; and Fig. (C) shows a change of a target ignition timing.

The target exhaust energy calculated by the target exhaust energy calculation unit 62 is the instant target exhaust energy, which changes as shown in FIG. 4 (B).

During the warming up process of the catalyst 50, it is not possible to instantly raise the catalyst bed temperature Tc up to a target temperature. Thus, a control is made for raising the catalyst bed temperature until the target temperature while taking some extent of time. More concretely, the ECU 60 determines at time t1 the target exhaust energy (integration) Ea (t2) which should be taken at time t2 that is a time point after the elapse of a predetermined period A from time t1, as shown in FIG. 4(A).

Then, the target exhaust energy (integration) is divided by the predetermined period A so as to calculate the target exhaust energy (instant) at time t1 that is shown in FIG. 4(B). The target ignition timing calculation unit 67 calculates a target ignition timing for implementing the calculated target exhaust energy (instant), as shown in FIG. 4(C).

As described above, the present first embodiment calculates the target total energy E_total by adding the target work, the target exhaust energy and the cooling heat loss, further calculating the target fuel supply quantity, the target intake quantity and the target ignition timing based on the E_total. According to the present first embodiment, the plurality of actuators such as the injector 18, the ignition plug 20, the variable valve mechanism 25 and the throttle motor 26 are driven based on the target fuel supply quantity, the target intake quantity and the target ignition timing which are calculated while considering the exhaust energy and the cooling heat loss besides the engine power. When the plurality of actuators are driven as described above, the target work can be realized by the engine 1, an air-fuel ratio can be controlled to the target A/F and an exhaust energy that is necessary for catalyst warming up can be obtained. It is, therefore, possible to implement a plurality of functions required to the engine 1.

Although the target ignition timing determination unit 67C determines the target ignition timing by referring to a map in the present first embodiment, the target ignition timing may be determined by using, instead of the map, a function that defines the relationship between a target in-cylinder temperature and a target ignition timing.

Further, the target ignition timing determination unit 67C may consider a load KL, an engine revolution number NE and a cooling water temperature Tw that give an effect to the relationship between the target in-cylinder temperature and the target ignition timing when determining the target ignition timing. That is, the target ignition timing determination unit 67C may have inputs for the above mentioned load KL or the likes.

Further, although the cooling heat loss is calculated based on the NE and Tw in the present first embodiment, an alternate technique in which the cooling water temperature Tw is controlled to a target value thereof may be usable when the system is capable of controlling the cooling water temperature Tw.

Furthermore, the technique to calculate the target ignition timing for realizing the target exhaust energy is not limited to the one described in the present first embodiment, and other technique may be usable.

It should be noted that, in the present first embodiment, the engine 1 accords with the "internal combustion engine" in the first aspect of the present invention; the ECU 60 corresponds to the "control quantity calculation means" and the "drive control means" in the first aspect of the present invention; and the injector 18, the ignition plug 20, the variable valve mechanism 26 and the throttle motor 34 correspond to the "plurality of actuators" in the first aspect of the present invention.

Further, in the first aspect of the present invention, the target work calculation unit 61, the target exhaust energy calculation unit 62 and the cooling heat loss calculation unit 63 correspond to the "desired value calculation means"; and the adder unit 64 corresponds to the "desired value adding means" in the first aspect of the present invention.

Furthermore, in the first aspect of the present invention, the target fuel supply quantity calculation unit 65 corresponds to the "fuel supply quantity calculation means" in the second aspect of the present invention; the target intake quantity calculation unit 66 corresponds to the "intake quantity calculation means" in the second aspect of the present invention; the target ignition timing calculation unit 67 corresponds to the "ignition timing calculation means" in the second aspect of the present invention; the exhaust gas quantity calculation unit 67A corresponds to the "exhaust gas quantity calculation means" in the third aspect of the present invention; and the target in-cylinder temperature calculation unit 67B corresponds to the "in-cylinder temperature calculation means" in the third aspect of the present invention.

Second Embodiment

Next, a second embodiment of the present invention will be described with reference to FIG. 5 and FIG. 6(A) thorough FIG. 6(D).

The hardware shown in FIG. 1 can be used for a system according to the present second embodiment.

Feature of Second Embodiment

In the above described first embodiment, the target work is realized mainly by the target fuel supply quantity and the target intake quantity. In other words, the ignition timing is determined so that mainly the target exhaust energy is realized. The above described first embodiment has no specific problem in a case where the target torque is not rapidly changed or the responsiveness required as a vehicle driving capability is sufficiently satisfied only by an intake quantity control, such as, for example, during a steady drive or a cruse control.

It should be noted that the target torque may be rapidly changed depending on a driving condition of a vehicle. Such a change may occur, for example, at the time of gear change or during execution of a vehicle stability control (VSC). In such a case, the responsiveness to follow the target torque may not sufficiently obtained only by controlling the intake quantity. That is, following the rapid change of the target torque may be impossible even if the throttle angle TA is controlled and the varying control of the valve opening characteristics (open-close valve timings and lift amount) is executed.

In the present second embodiment, therefore, a case in which one of a target ignition timing based on a target exhaust energy and a second target ignition timing based on a target work can be selected for making it possible to deal with the rapid changes of the target torque and the target work will be described.

Figure 5:
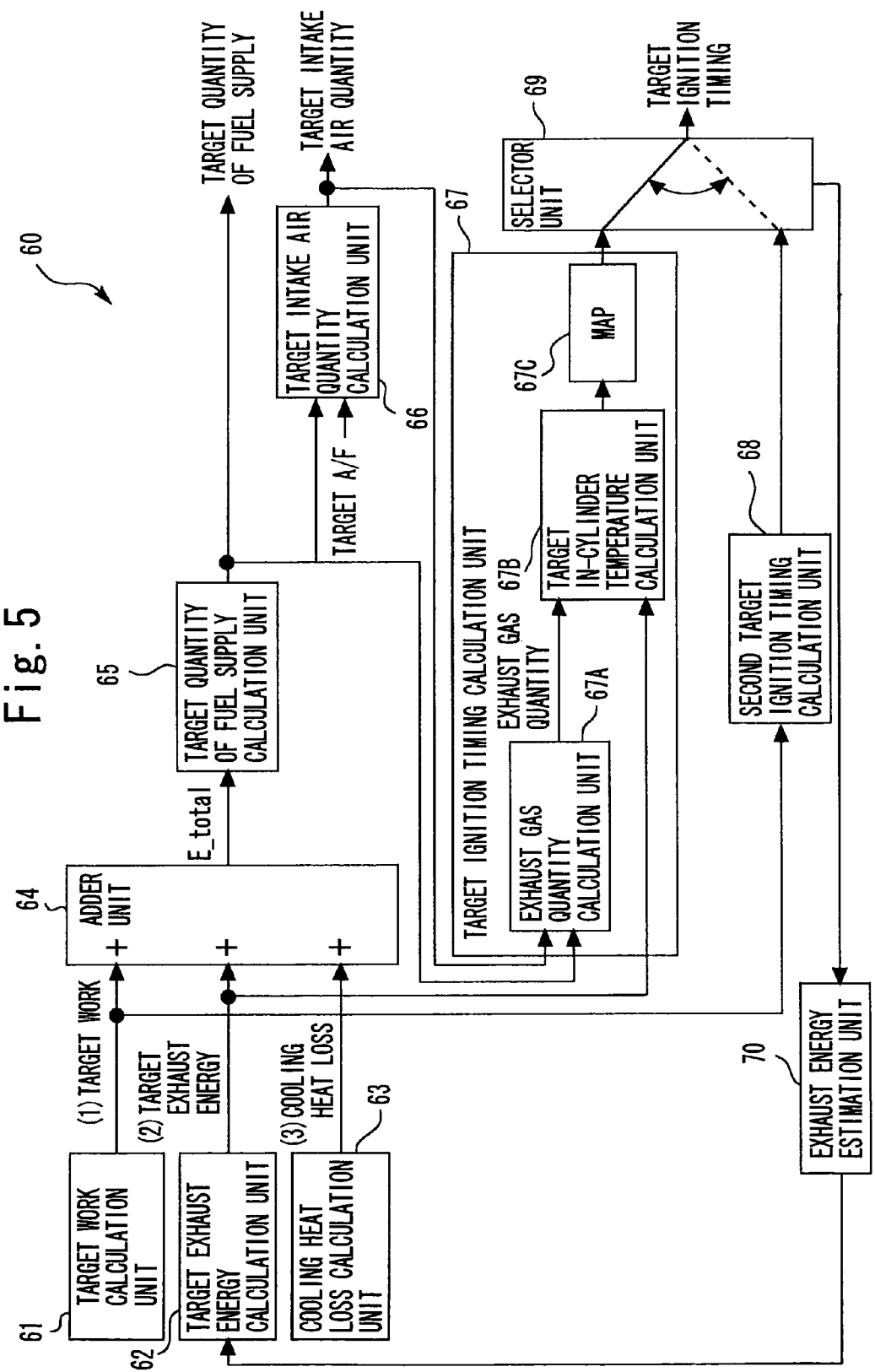
FIG. 5 is a drawing for explaining a control quantity calculation flow executed in the ECU 60 in a second embodiment of the present invention.

FIG. 5 is a drawing for explaining a control quantity calculation flow executed in the ECU 60 in the present second embodiment.

The ECU 60 shown in FIG. 5 includes a second target ignition timing calculation means 68, a selector unit 69 and an exhaust energy estimation unit 70 in addition to the construction shown in FIG. 3. Hereinafter, these different points will be mainly described.

The target work calculated by the target work calculation unit 61 is supplied not only to the adder unit 64 but also to the second target ignition timing calculation means 68. The second target ignition timing calculation means 68 calculates an ignition timing for realizing the target work (referred to as the "second target ignition timing", hereafter).

The second target ignition timing calculated by the second target ignition timing calculation unit 68 is supplied to the selector 69. The selector 69 also receives the target ignition timing calculated by the above described target ignition timing calculation unit 67, i.e., the target ignition timing for realizing the target exhaust energy.

The selector unit 69 selects one of the "target ignition timing" for realizing the target exhaust energy and the "second target ignition timing" for realizing the target work depending on a driving condition of the engine 1. The selection by the selector unit 69 is executed based on, for example, the result of arbitration among requirements of various vehicle controls.

More specifically, the selector unit 69 selects the second target ignition timing when it is necessary to deal with the rapid changes of the target torque and the target work (e.g., at the time of gear change or VSC control). Otherwise, that is, when there is no need to deal with the rapid changes of the target torque and the target work (e.g., at the time of cruse driving), the selector unit 69 selects the target ignition timing.

The selected state of the selector unit 69 is supplied to an exhaust energy estimation unit 70. When "the second target ignition timing" is selected by the selector unit 69, the actual exhaust energy becomes estranged from the target exhaust energy (integration), as described later. Thus, the integrated value of an actual exhaust energy (referred to as "exhaust energy (integration)", hereafter) is estimated based on the second target ignition timing by the exhaust energy estimation unit 70. The estimated actual exhaust energy (integration) is supplied to the target exhaust energy calculation unit 62. When a target ignition timing is again selected by the selector unit 69, the target exhaust energy calculation unit 62 calculates a target exhaust energy (instant) while considering the actual exhaust energy (integration).

FIG. 6(A) to FIG. 6(D) are timing charts showing a change of a target exhaust energy at the time when an ignition timing is changed in order to rapidly change a target torque in the present second embodiment. Concretely, FIG. 6(A) shows a change of the target torque; FIG. 6(B) shows a change of the integrated value of the target exhaust energy; FIG. 6(C) shows a change of the instant value of the target exhaust energy; and FIG. 6(D) shows a change of the target ignition timing.

Warming up of the catalyst is started at time t11. At this time t11, the target exhaust energy (integration) Ea (t14) for time t14 that will come after the elapse of a predetermined period of time A is determined. Further, this target exhaust energy (integration) Ea (t14) is divided by the predetermined period of time A so as to calculate the target exhaust energy (instant) for time t11, as shown in FIG. 6(C). Furthermore, as shown in FIG. 6(D), the target ignition timing for implementing the target exhaust energy (instant) is calculated.

It should be noted that the second target ignition timing for implementing the target work is calculated by the second target ignition timing calculation unit 68 at the same time as the above target ignition timing is calculated, although it is not illustrated. At time t11, the selector unit 69 selects the "target ignition timing" because there is no rapid change in the target torque to be dealt with.

As shown in FIG. 6(A), the target torque rapidly changes (suddenly decreases) at time t12. In the present example, the target torque is put back to the previous value at time t13 that comes after the elapse of a predetermined period of time B from time t12. Thus, the target torque is implemented by priority during the period of time B from time t12 to time t13. As a result, the selector unit 69 discussed above selects the "second target ignition timing" in order to deal with this rapid change of the target torque.

Particularly, a target ignition timing that is more retarded than that prevailed during time t11 to t12 is set at time t12, as shown in FIG. 6(D) This causes the ratio of the exhaust energy to the total energy generated in the engine 1 to be increased. Because of this, the actual exhaust energy (instant) becomes larger than the target exhaust energy (instant) during the predetermined period of time B, as shown by hatching H in FIG. 6(C). In other words, the target exhaust energy (instant) is not realized during the predetermined period of time B when the target torque is realized by priority.

Even more particularly, as shown in FIG. 6 (B), the actual exhaust energy (integration) becomes larger than the target exhaust energy (integration) during this period of time B. That is, the target exhaust energy (integration) is not realized during the period of time B.

Then, the target exhaust energy (instant) is recalculated at time t13 when the target torque is put back to the previous value and the period of time B during which the target torque is realized by priority is terminated. Here, the exhaust energy estimation unit 70 calculates the actual exhaust energy (integration) based on the second target exhaust energy during the period of time B. Accordingly, the target exhaust energy estimation unit 70 calculates at time t13 the target exhaust energy (instant) while considering the actual exhaust energy (integration) so that the previously calculated target exhaust energy (integration) Ea (t14) will be achieved at time t14.

Concretely, the target exhaust energy calculation unit 62 calculates the target exhaust energy (instant) for time t14 by dividing the difference between the actual exhaust energy (integration) at time t13 and the target exhaust energy (integration) Ea (t14) by the period of time from time t13 to time t14.

Even more particularly, a target ignition timing for realizing the recalculated target exhaust energy (instant) is calculated by the above described target ignition timing calculation unit 67. Then, the "target ignition timing" for realizing the target exhaust energy (instant) is selected by the selector unit 69.

As described above, the present second embodiment can execute the selection between the target ignition timing and the second target ignition timing in order to follow the rapid change of the target torque which can not be followed by utilizing the intake quantity control. During the period of time B when the second target ignition timing is selected, the actual exhaust energy (integration) in this period of time B is estimated, since it is impossible to achieve the target exhaust energy (instant, integration). Then, when the target ignition timing is selected again, the target exhaust energy (integration) is recalculated while considering the estimated actual exhaust energy (integration). Thus, the previously calculated target exhaust energy (integration) Ea (t14) can be achieved even in a case where the target torque changes rapidly.

In the present second embodiment, the second target ignition timing calculation unit 68 corresponds to the "second ignition timing calculation means" in the fourth aspect of the present invention; the selector unit 69 corresponds to the "ignition timing selecting means" in the fourth aspect of the present invention; the target exhaust energy calculation unit 62 corresponds to the "correction means" in the fifth or the sixth aspect of the present invention; and the exhaust energy estimation unit 70 corresponds to the "exhaust energy estimation means" in the sixth aspect of the present invention.

The invention claimed is:

1. An internal combustion engine control device, comprising:
control quantity calculation means for calculating a plurality of control quantities by which an energy generated by the internal combustion engine is adjusted; and
drive control means for executing driving controls for a plurality of actuators based on the plurality of control quantities calculated by the control quantity calculation means,
wherein said control quantity calculation means comprises:
desired value calculation means for calculating a desired value regarding a power of said internal combustion engine, a desired value regarding exhaust of said internal combustion engine and a desired value regarding a cooling heat loss of said internal combustion engine, respectively in a style of energy; and
desired value adding means for adding each of the desired values calculated by said desired value calculation means for determining a total desired value, wherein
said control quantity calculation means determines said plurality of control quantities based on said total desired value.

2. The internal combustion engine control device according to claim 1, wherein
said plurality of control quantities are an intake quantity and an ignition timing, and
said control quantity calculation means further comprises:
fuel supply quantity calculation means for calculating a fuel supply quantity necessary for generating said total desired quantity;
intake quantity calculation means for calculating an intake quantity necessary for implementing a predetermined air-fuel ratio while using said fuel supply quantity; and
ignition timing calculation means for calculating said ignition timing while using said desired value regarding exhaust.

3. The internal combustion engine control device according to claim 2, wherein said ignition timing calculation means comprises:
exhaust gas quantity calculation means for calculating an exhaust gas quantity of said internal combustion engine while using said fuel supply quantity and said intake quantity; and in-cylinder temperature calculation means for calculating an in-cylinder temperature based on said exhaust gas quantity and said desired value regarding exhaust, wherein said ignition timing calculation means calculates said ignition timing based on said in-cylinder temperature.

4. The internal combustion engine control device according to claim 2, wherein said internal combustion engine is mounted on a vehicle, and said control quantity calculation means comprises:

second ignition timing calculation means for calculating a second ignition timing based on said desired value regarding power; and ignition timing selecting means for selecting either the ignition timing calculated by said ignition timing calculation means or said second ignition timing, based on a driving condition of said vehicle.

5. The internal combustion engine control device according to claim 4, wherein said control quantity calculation means further comprises correction means for correcting said desired value regarding exhaust when said ignition timing is selected again by said ignition timing selecting means after said second ignition timing is selected by said ignition timing selecting means.

6. The internal combustion engine control device according to claim 5, wherein said control quantity calculation means further comprises exhaust energy estimation means for estimating an actual exhaust energy arising during the period in which said second ignition timing is selected by said ignition timing selecting means, and said correction means corrects said desired value regarding exhaust while considering the actual exhaust energy estimated by said exhaust energy estimation means.

7. An internal combustion engine control device, comprising:

control quantity calculation unit for calculating a plurality of control quantities by which an energy generated by the internal combustion engine is adjusted; and a drive control unit for executing driving controls for a plurality of actuators based on the plurality of control quantities calculated by control quantity calculation unit, wherein said control quantity calculation unit comprises:

a desired value calculation unit for calculating a desired value regarding a power of said internal combustion engine, a desired value regarding exhaust of said internal combustion engine and a desired value regarding a cooling heat loss of said internal combustion engine, respectively in a style of energy; and a desired value adding unit for adding each of the desired values calculated by said desired value calculation unit for determining a total desired value, wherein said control quantity calculation unit determines said plurality of control quantities based on said total desired value.

8. The internal combustion engine control device according to claim 7, wherein said plurality of control quantities are an intake quantity and an ignition timing, and said control quantity calculation unit further comprises:

a fuel supply quantity calculation unit for calculating a fuel supply quantity necessary for generating said total desired quantity;

an intake quantity calculation unit for calculating an intake quantity necessary for implementing a predetermined air-fuel ratio while using said fuel supply quantity; and an ignition timing calculation unit for calculating said ignition timing while using said desired value regarding exhaust.

9. The internal combustion engine control device according to claim 8, wherein said ignition timing calculation unit comprises:

an exhaust gas quantity calculation unit for calculating an exhaust gas quantity of said internal combustion engine while using said fuel supply quantity and said intake quantity; and an in-cylinder temperature calculation unit for calculating an in-cylinder temperature based on said exhaust gas quantity and said desired value regarding exhaust, wherein said ignition timing calculation unit calculates said ignition timing based on said in-cylinder temperature.

10. The internal combustion engine control device according to claim 8, wherein said internal combustion engine is mounted on a vehicle, and said control quantity calculation unit comprises:

a second ignition timing calculation unit for calculating a second ignition timing based on said desired value regarding power; and an ignition timing selecting unit for selecting either the ignition timing calculated by said ignition timing calculation unit or said second ignition timing, based on a driving condition of said vehicle.

11. The internal combustion engine control device according to claim 10, wherein said control quantity calculation unit further comprises a correction unit for correcting said desired value regarding exhaust when said ignition timing is selected again by said ignition timing selecting unit after said second ignition timing is selected by said ignition timing selecting unit.

12. The internal combustion engine control device according to claim 11, wherein said control quantity calculation unit further comprises an exhaust energy estimation unit for estimating an actual exhaust energy arising during the period in which said second ignition timing is selected by said ignition timing selecting unit, and said correction unit corrects said desired value regarding exhaust while considering the actual exhaust energy estimated by said exhaust energy estimation unit.

* * * * *